United States Patent Office 2,893,919
Patented July 7, 1959

2,893,919

METHOD FOR PRODUCING ALCOHOL FROM WASTE SULPHITE CELLULOSE LIQUORS

Fritz Opderbeck, Friedrichshafen-Windhag, Erwin Franke, Einfeld, near Neumunster, and Günter Trapp, Okriftel (Main), Germany, assignors to Phrix-Werke Aktiengesellschaft, Hamburg, Germany, a corporation of Germany No Drawing. Application August 23, 1955
Serial No. 530,207

Claims priority, application Germany August 25, 1954

7 Claims. (Cl. 195—39)

It is known that alcohol is produced in industry from waste sulphite cellulose liquors obtained in producing cellulose from wood according to the sulphite method. Considering the total amount of fermentable compounds contained in the waste sulphite liquor the alcohol yields in such process are, generally, not satisfactory. This, especially, is true of liquors obtained by boiling cellulose matters for instance, wood, and the like, with acid liquors for a relatively short time only, resulting in a relatively hard pulp. These waste sulphite cellulose liquors contain the fermentable sugars, most, in the form of higher molecular polysaccharides which cannot be directly fermented by means of yeast.

It is an object of our invention to provide an improved method whereby alcohol yields are considerably increased.

According to this invention, we adjust the pH of the waste sulphite cellulose liquor from which alcohol is to be produced to between 4.5 and 7 and then add an enzyme preparation of the enzymes of which are derived from fungi of the mold type and effective in hydrolyzing the polysaccharides contained in the liquor. Finally, we add yeast to the liquor which has undergone alcoholic fermentation in the known manner, and distill off the alcohol produced.

By such operations considerably increased alcohol yields are obtained even in the case of waste lyes obtained in the production of hard paper pulp which hitherto, on account of the low alcohol yield, generally have not been utilised.

The enzyme preparations employed according to the invention may be any of the known products of the mold type, such as Aspergillus, Rhizopus, Penicillium or Mucor. Especially, enzymes derived from fungi of the Aspergillus and Rhizopus types are suitable for the purpose of invention and amongst these, preferably, *Aspergillus oryzae* may be used. For breeding, at best, moistened bran is used as nutritive substratum which is seeded with the respective mold fungus and held at a suitable temperature. The enzyme preparation so obtained may be directly used or added to the neutralized sulphite waste liquor in the form of an aqueous extract.

It has been found that the microorganisms employed according to the invention and their active enzymes, respectively, are effective in cracking the bisulphite-sugar compounds formed in the waste liquor which considerably impede fermentation so that a complete fermentation of the sugars is accomplished.

In order to obtain the effect of the present invention, the pH of the waste sulphite liquor is, prior to the addition of an enzyme preparation, adjusted to between 4.5 and 7, preferably to between 5 and 6.

As agents for neutralizing the liquor there are advantageously used sodium or potassium carbonate, sodium or potassium hydroxide, ammonia, lime, caustic lime, limestone and, preferably, lime milk.

Fermentation of the waste liquor the pH of which has suitably been adjusted by adding an alkaline agent and to which an enzyme preparation has been added is effected in known manner by means of yeast, e.g. compressed yeast, at the usual temperature of about 34° C. The mixture may be added with nutrients if necessary.

According to one form of execution of the invention, the enzyme preparation for hydrolyzing the polysaccharides and yeast may simultaneously be added to the neutralized sulphite liquor.

The following examples which have no limitative character will show how this invention may be carried out.

*Example 1*

A waste sulphite cellulose liquor as obtained in the production of hard paper pulp by cooking pinewood with bisulphite liquor is added, at 80 to 90° C., with lime milk so as to adjust the pH to 5.6, and clarified by sedimentation. The liquor has a reducing matters content of 2.02% (defined by the Bertram method) and a fermentable sugar content of 1.7%. The liquor is cooled down to 33° C. and added with 0.1 g. diammonium phosphate and 10 cc. of an enzyme extract for 1 liter. The same is produced by breeding *Aspergillus oryzae* on a bran nutrient medium at 33 to 35° C. and extracting the latter with about the sixty-five fold amount of warm water.

Within a period of about two hours the contents of reducing matters and fermentable sugars rise to 2.48 and 2.1%, respectively. Compressed yeast is added and fermentation takes place resulting, within 24 hours, in an alcohol yield of 10 g./l. mash. The alcohol formed is then distilled off in known manner.

Likewise, enzyme extract and yeast may simultaneously be added to the liquor.

Without adding an enzyme preparation the same liquor gives an alcohol yield of 8 g./l. mash, i.e. that an increase in yield of 25% is reached by the alcohol producing method according to the invention.

*Example 2*

Good results have been obtained by the process of Example 1 when using a waste sulphite liquor as it is obtained in producing a soft and well-bleachable pulp by cooking pinewood with bisulphite liquor under stronger conditions. The liquor used had a reducing matters content of 1.9% and a fermentable sugar content of 1.6%. Due to the effect of the *Aspergillus oryzae* extract of the content of reducing matters increased to 2.14%, and that of fermentable sugar to 1.8%. The alcohol yield reached 9 g. for 1 liter mash as compared with 7.7 g./l. without the use of an enzyme preparation, i.e. an increase in yield of 17%.

Thus, the method of the invention has the advantage of giving increase in alcohol yields. Moreover, due to the considerable acceleration of fermentation the method of invention makes it possible to save in space for the fermentation equipment. It is economical to practice as the costs of the distillation are lowered owing to the fact that the alcohol content of the mash is increased.

The nutrient media needed for breeding the microorganisms may repeatedly be used for the same purpose and may serve as foodstuffs or for other nutritive purposes if used up.

We claim:

1. A process for the production of alcohol from waste sulphite cellulose liquor which comprises the successive steps of adjusting the pH of a waste sulphite liquor to between 4.5 and 7.0, adding to the liquor an enzyme preparation the enzymes of which are derived from fungi of the Aspergillus mold type to effect hydrolysis of the polysaccharides contained in the liquor, fermenting the liquor by means of yeast, and distilling off the alcohol formed.

2. A process for the production of alcohol from waste sulphite cellulose liquor which comprises the successive steps of adjusting the pH of a waste sulphite liquor to between 4.5 and 7.0 by means of an alkaline agent selected from the group consisting of sodium carbonate, potassium carbonate, sodium hydroxide, potassium hydroxide, ammonia, lime, caustic lime, limestone, and lime milk, adding to the liquor an enzyme preparation the enzymes of which are derived from fungi of the Aspergillus mold type to effect hydrolysis of the polysaccharides contained in the liquor, fermenting the liquor by means of yeast, and distilling off the alcohol formed.

3. A process for the production of alcohol from waste sulphite cellulose liquor which comprises the successive steps of adjusting the pH of a waste sulphite liquor to between 4.5 and 7.0, adding to the liquor an aqueous extract of an enzyme preparation the enzymes of which are derived from fungi of the Aspergillus mold to effect hydrolysis of the polysaccharides contained in the liquor, fermenting the liquor by means of yeast, and distilling off the alcohol formed.

4. A process for the production of alcohol from waste sulphite cellulose liquor which comprises the successive steps of adjusting the pH of a waste sulphite liquor obtained by hard pulp cooking to between 4.5 and 7.0, adding to the liquor an enzyme preparation the enzymes of which are derived from fungi of the Aspergillus mold type to effect hydrolysis of the polysaccharides contained in the liquor, fermenting the liquor by means of yeast, and distilling off the alcohol formed.

5. A process for the production of alcohol from waste sulphite cellulose liquor which comprises the successive steps of adjusting the pH of a waste sulphite liquor to between 5.0 and 6.0 by means of lime milk, adding to the liquor an enzyme preparation the enzymes of which are derived from fungi of the Aspergillus mold type to effect hydrolysis of the polysaccharides contained in the liquor, fermenting the liquor by means of yeast, and distilling off the alcohol formed.

6. A process for the production of alcohol from waste sulphite cellulose liquor which comprises the successive steps of adjusting the pH of a waste sulphite liquor to between 4.5 and 7.0, simultaneously adding to the liquor an enzyme preparation the enzymes of which are derived from fungi of the Aspergillus mold type, and yeast to effect hydrolysis of the polysaccharides and fermentation, and distilling off the alcohol formed.

7. A process for the production of alcohol from waste sulphite cellulose liquor which comprises the successive steps of adjusting the pH of a waste sulphite liquor to between 5 and 6 at a temperature of 80 to 90° C., adding to the liquor cooled down to 30 to 35° C. an enzyme preparation the enzymes of which are derived from *Aspergillus oryzae* to effect hydrolysis of the polysaccharides contained in the liquor, fermenting the liquor by means of compressed yeast, and distilling off the alcohol formed.

References Cited in the file of this patent

UNITED STATES PATENTS

| 1,838,599 | Wells | Dec. 29, 1931 |
| 2,219,668 | Underkofler et al. | Oct. 29, 1940 |
| 2,280,307 | Diehm | Apr. 21, 1942 |
| 2,421,985 | Boehm et al. | June 10, 1947 |
| 2,529,131 | Boinot et al. | Nov. 7, 1950 |

OTHER REFERENCES

"The Chemistry and Technology of Enzymes," 1942, by Henry Tauber. Publ. by John Wiley and Sons (New York), page 401.